June 30, 1931.  E. E. PRYOR  1,812,059
COMBINATION TRIP SOCKET FOR FISHING TOOLS
Filed Feb. 6, 1929  2 Sheets-Sheet 1
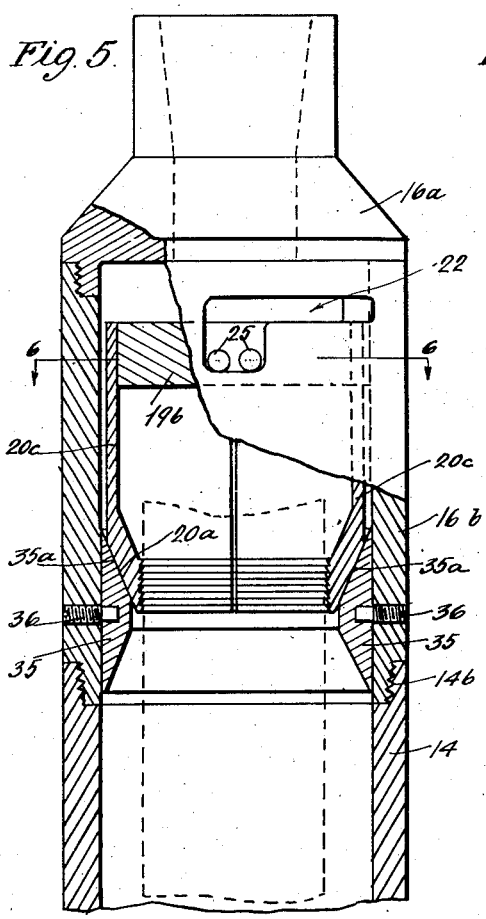
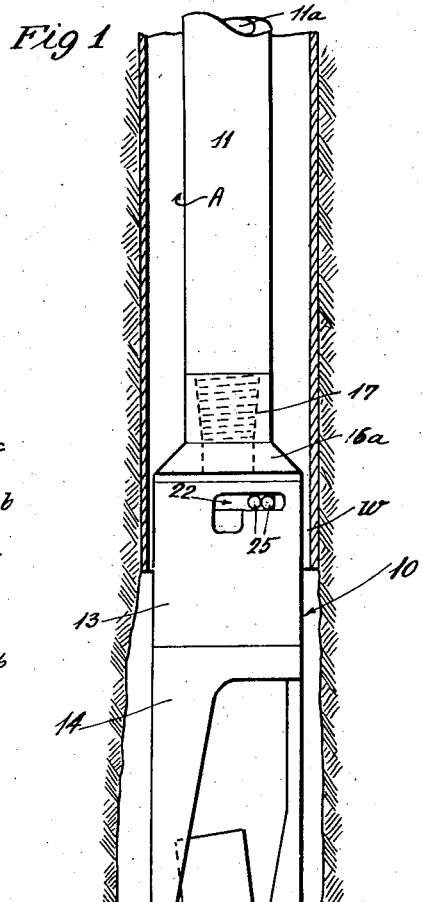
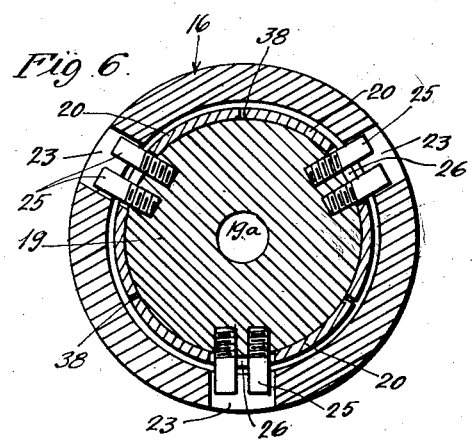
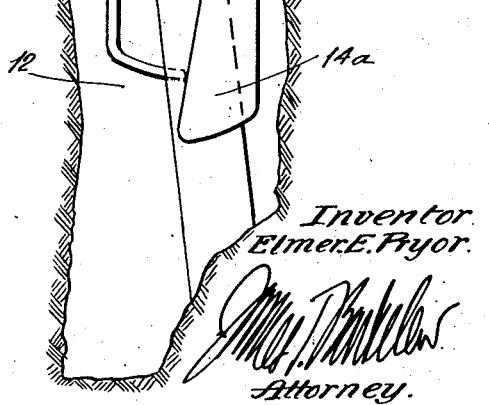
Inventor
Elmer E. Pryor.
Attorney.

June 30, 1931.  E. E. PRYOR  1,812,059
COMBINATION TRIP SOCKET FOR FISHING TOOLS
Filed Feb. 6, 1929  2 Sheets-Sheet 2
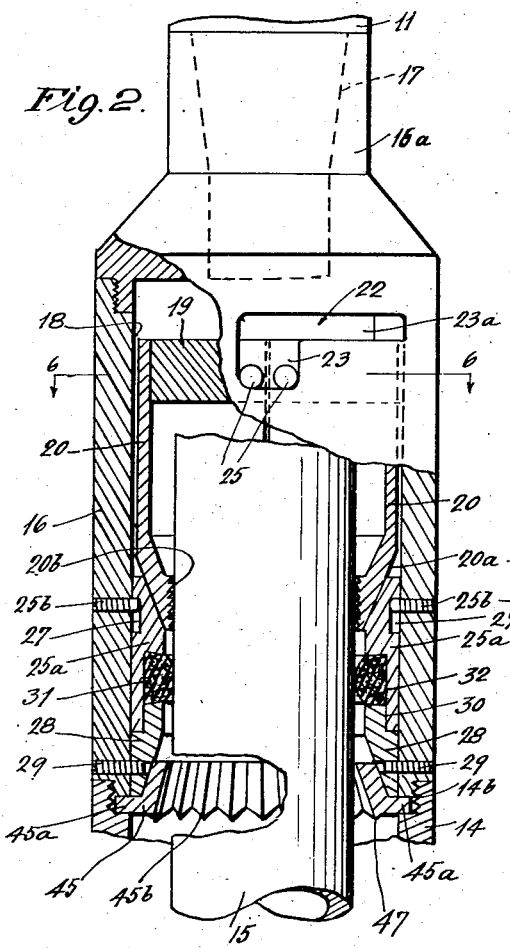
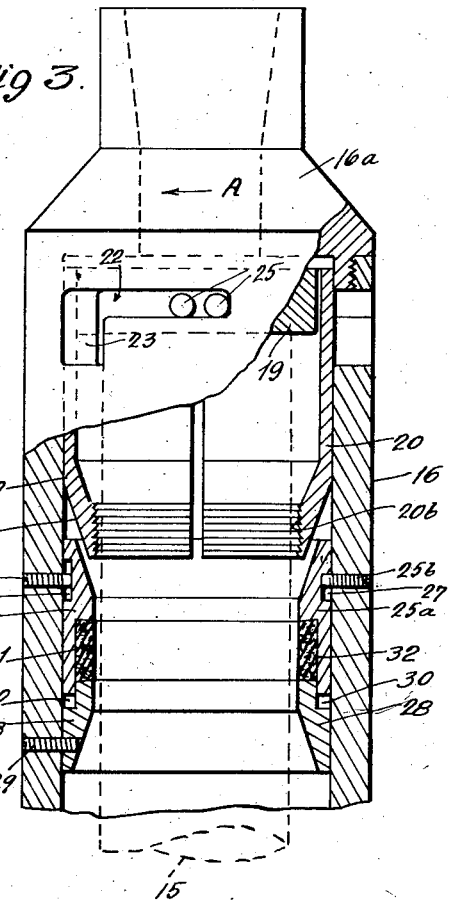
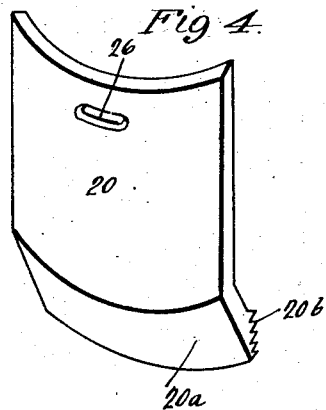
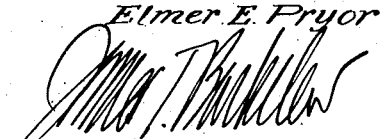
Inventor
Elmer E. Pryor
Attorney Patented June 30, 1931

1,812,059

UNITED STATES PATENT OFFICE

ELMER E. PRYOR, OF FULLERTON, CALIFORNIA

COMBINATION TRIP SOCKET FOR FISHING TOOLS

Application filed February 6, 1929. Serial No. 337,859.

This invention has to do with oil well fishing tools and is concerned particularly with a tool of this general character embodying the use of slip members adapted to be lowered to a general surrounding position about the fish, and to be releasably brought into gripping engagement with the latter by correspondingly actuating the drill stem at the ground level.

The present type of tool may be generally described as comprising a barrel or socket suspended from the drill stem and containing the gripping elements or slips, the slips being locked in their outer radial or work releasing position during the lowering of the drill stem within the well and until the fish is centered with relation to the slips. After these operations the locking means is released by turning the drill stem, and the slips, by virtue of wedging engagement with the barrel upon subsequent upward movement thereof, are brought into gripping engagement with the fish. It will be understood that any suitable means may be incorporated in the tool for centering the fish relative thereto, that is, for bringing the fish from a relatively offset location within the well to such position that the slips may be lowered around it.

A particular advantage is obtained by the use of the present tool in that should the fish fail to be secured by the tool in one operation, the slips may readily be re-positioned and again applied to the fish as in the first operation without having to remove the tool from the well. Numerous additional features and advantages of the invention will be more clearly and fully understood from the following detailed description of a typical embodiment thereof, reference being had throughout the description to the annexed drawings, in which:

Figure 1 is a general view showing a tool embodying the invention, the tool being illustrated in working position within a well;

Fig. 2 is an enlarged fragmentary elevation of the tool illustrated in Fig. 1, parts of the tool being broken away to show the slip and socket construction;

Fig. 3 is a view generally similar to Fig. 2 omitting the end cutter and showing the parts in changed positions;

Fig. 4 is a perspective view of the one of the slips embodied in the tool;

Fig. 5 is a view similar to Fig. 2 but illustrating a variational form of wedge construction; and Fig. 6 is a horizontal section on line 6—6 of Figs. 2 and 5.

Referring first to Fig. 1, I have shown a tool, generally indicated at 10, suspended from the lower end of the usual drill string 11 and lowered within the well W to the working or drilling region 12. The tool is seen to embody an upper portion 13, which may be termed the socket, and a lower portion 14 shaped to provide a centering hook 14a. Thus, assuming that the fish 15 is in a slanting or relatively offset position within the well bore 12, after lowering the tool and rotating the latter by turning the drill stem in the direction of arrow A, the hook 14a is caused to engage the fish and to move it to a central position, relative to the bore, within the lower portion 14 of the tool. The fish thereby is positioned in such a manner that the gripping element or slips in the socket may be applied thereto as will later be described. It is again mentioned that the invention is not to be considered as restricted to the illustrated means for centering the fish relative to the socket, this means being namely, the portion 14, and that the socket may be incorporated in tools having various means for suitably positioning the fish.

The slip and socket device, as shown in Fig. 2, embodies a vertically extending barrel 16, joined to the lower portion 14 of the tool as at 14b, and a cap 16a threaded at 17 on the drill stem 11. Within the barrel and annularly spaced at 18 from the wall thereof is a cylindrical slip supporting block 19, having a bore 19a (see Fig. 6) said block being co-axial with the barrel and vertically and rotatively movable relative thereto. A plurality of vertically extending segmental circular slips 20, circumferentially spaced at 38, are mounted at their upper ends on the supporting block 19, and, as will later be seen, are mounted in such a manner as to be radially movable within the space 18 between the block and the barrel. The slips are shaped at their lower ends to provide downwardly and inwardly inclined wedge faces 20a and inner serrated work engaging surfaces 20b.

A plurality of angular slots, generally indicated at 22, is formed in the barrel, the number of slots provided corresponding to the number of slips 20. Each slot has a vertically extending portion 23 which continues at its upper end in the horizontal portion 23a, the horizontal portions of the slots extending in the same relative direction. The supporting block 19 and the slips are held in position within the barrel by means of retention pins 25 inserted within the angular slots in the barrel, through slots 26 in the slips, and threaded into the supporting block. The pins preferably extend loosely through slots 26 to permit of free radial movement of the slips within the limits of space 18. It will be seen that the barrel is capable of both vertical and rotational movement, relative to the supporting block and slip assembly, by moving the barrel in such a manner that pins 25 are caused to follow the general course of the angular slots 22. Thus by lowering the barrel relative to said assembly from the position of Fig. 2, and subsequently rotating it to position the parts as shown in Fig. 3, the slips not only are removed from work engaging to work releasing position, but become locked in the latter position by virtue of the retention pins 25 having been thrust into the horizontal slot portions 23a.

An annular wedge 25a is mounted on the barrel below the slips by means of pins 25b threaded through the walls of the barrel and projecting into vertically extending slots 27 formed in the wedge. The wedge has a sliding fit with the inner wall of the barrel and is vertically movable relative thereto in accordance with the length of slots 27. A stop ring 28 is rigidly mounted in the barrel below the wedge 25a by means of pins 29, the stop ring being shaped to form, with the barrel wall, an annular channel 30 for confining the lower end of the wedge. A suitable compressible and elastic packing material 31, for instance rubber, is confined in the annular channel 32 formed by the wedge and stop ring, the pack 31 normally having a rectangular cross section when the parts are in the position shown in Fig. 3. Upon downward movement of the annular wedge 25a relative to the stop ring, the pack 31 becomes compressed and laterally expanded to such an extent as to engage the fish 15, when the parts are in the position shown in Fig. 2. Thus by virtue of the movable wedge and pack arrangement, there is provided gripping means in addition to the serrated surfaces 30b of the slips. The pack, due to its resiliency, obviously serves to return the wedge ring to its normal position after the slips are relieved of their load.

In Fig. 5 I have illustrated a socket having a barrel 16b, slips 20c and a slip supporting block 19b, these parts being similar to the corresponding parts in the previously described socket, and have included in this type a variational and simplified form of wedge without the inclusion of a pack as in the former instance. In this form I provide a single annular wedge 35, rigidly attached to the barrel by pins 36, and having an upper inclined wedge face 35a for engaging the downwardly inclined faces 20a of the slip. The wedge construction in either instance evidently is of such simplicity that a given tool may readily be equipped with either form as desired.

As shown in Fig. 5 it may be desirable to include in the tool an annular end mill or cutter 45 having a flange 45a confined between the barrel and the lower portion 14, the upper face of the cutter bearing against the stop ring 28 as shown. The cutter is shaped to provide the inclined teeth 45b, the lower ends of which project somewhat below the cutter body, as at 47, to provide suitable cutting edges. It will be apparent that by incorporating the end mill in the tool as described, in the event the upper end of the fish is of such shape or has irregularities such that it will extend within the barrel but will not pass through the wedge ring, the tool may be rotated until the cutter has removed such irregularities, after which the tool may be lowered to the desired position about the fish.

In carrying out fishing operations with the present tool, the parts thereof are first adjusted to the position illustrated in Fig. 3, that is, the slips are locked in work releasing positions by thrusting the retention pins into the horizontal slot portions 23a, before the tool is lowered into the well. After the tool is lowered to the location of the fish and the latter is more or less centered within the lower portion 14 of the tool as previously described, the tool is further lowered until the upper end of the fish is contained within the socket as illustrated by the dotted lines in Fig. 3. Thus it is seen that the slip supporting block 19 is brought to rest on the upper end of the fish and therefore the engagement between said block and the fish is sufficient to permit relative rotatory movement of the barrel. By turning the drill stem in the direction of arrow A until the pins are removed from the horizontal slot portion and subsequently raising the barrel until the pins are in the position of Fig. 2, the slips then are free to engage the fish in accordance with the action of wedge ring 25a. Therefore as the drill stem and barrel are raised from the well, the slip, supporting block, and the fish tend to remain relatively stationary until the slips are forced into such tight engagement with the fish that the latter is raised along with the barrel. Fishing operations often may be facilitated by delivering circulating fluid downward through the bore 11a of the drill string and through bore 19a in the supporting block.

If the fish fails to become engaged in one series of operations as described, recovery often may be made by lowering the socket around the upper end of the fish, with the retention pins in portions 23 of the slots, the slips being caused to spread radially and drop downward around the fish by virtue of the engagement of the fish with the lower ends of the slips as the tool is lowered. The slips though having been spread sufficiently to allow the fish to pass upwardly therebetween, are at all times in engagement with the work, and therefore upon subsequent upward movement of the barrel the slips are immediately caused to grip the fish due to the action of wedge 25a.

From the foregoing it will be seen that the action of the retention pins in the barrel slots is essentially that of a trip, by means of which the slips may be brought either into work engaging or releasing position by actuating the trip mechanism through the drill stem. And furthermore, although the trip may be caused to release the slips in any one operation, the latter may at any time be restored to their original or work releasing positions, in the manner described.

It will be understood the drawings and descriptions are to be considered merely as illustrative of and not restrictive on the broader claims appended hereto, for various changes in design, structure and arrangement may be made without departing from the spirit and scope of said claims.

I claim:

1. In a tool of the character described, a vertically extending barrel, a supporting member mounted within the barrel and vertically movable relative thereto, a gripping element loosely mounted on said member said element being radially movable relative to said member at the point of connection therewith, and wedge means whereby relative vertical movement of said supporting member and the barrel causes said gripping element to move radially inward from the barrel.

2. In a tool of the character described, a vertically extending barrel, a supporting member mounted within the barrel and vertically movable relative thereto, a gripping element loosely mounted upon and extending below said member, said gripping element being radially movable relative to said member at the point of connection therewith, and wedge means whereby upward movement of the barrel relative to said gripping element causes the latter to move radially inward from the barrel.

3. In a tool of the character described, a vertically extending barrel, a block mounted within the barrel and having limited vertical movement relative thereto, means for supporting said block on the barrel, a gripping element mounted on said supporting means and radially movable relative to the barrel and said block, said gripping element being in its outermost radial position when said block is in its uppermost position relative to the barrel, and wedge means whereby upward movement of the barrel relative to said block causes radial inward movement of the gripping member.

4. In a tool of the character described, a vertically extending cylindrical barrel, a cylindrical slip supporting block within the barrel and coaxial therewith, said block being annularly spaced from the barrel and vertically movable relative thereto, a vertically extending and segmental circular slip loosely mounted at its upper end on the outer surface of said block and being radially movable within the space between said block and the barrel, said slip extending below the block and having an inwardly inclined wedge face on its lower outer surface, and a wedge member on said barrel adapted to engage the wedge face of said slip to cause the latter to move radially inward upon relative upward movement of the barrel.

5. In a tool of the character described, a vertically extending cylindrical barrel having an angular slot through its wall, said slot extending vertically a predetermined distance and continuing horizontally at its upper end, a cylindrical slip supporting block within the barrel and coaxial therewith, said block being annularly spaced from the barrel and vertically and rotatively movable relative thereto, a radial projection on the block extending within said slot and adapted to limit relative movement between the block and barrel in accordance with the shape of said slot, a vertically extending segmental circular slip mounted at its upper end on said projection and radially movable within the space between said block and the barrel, said slip extending below the block and having a lower and inner work engaging surface, and wedge means whereby upward movement of the barrel relative to said supporting member causes radial inward movement of the slip.

6. In a tool of the character described, a vertically extending cylindrical barrel, a cylindrical slip supporting block within the barrel and coaxial therewith, said block being annularly spaced from the barrel and vertically movable relative thereto, a plurality of vertically extending circular segmental slips mounted at their upper ends on the outer surface of the block, said slips being circumferentially spaced and radially movable within the space between said block and the barrel, the lower portions of the slips having inwardly inclined wedge faces, and a wedge ring on said barrel below the slips adapted to engage said slips upon relative upward movement of the barrel to cause them to move radially inward.

7. A fishing tool embodying a vertically extending barrel adapted to be lowered around the fish, a slip supporting member within the barrel and vertically movable relative thereto, said member being adapted to rest upon the fish, a plurality of vertically extending slips within the barrel and circumferentially arranged about the axis thereof and about the fish, said slips being joined at their upper ends to said supporting member and being radially movable relative to said member at the point of connection therewith, means for releasably locking the supporting member in its uppermost position relative to the barrel, in which position said slips are in their outermost radial position, and wedge means on said barrel adapted to cause the slips to move radially inward to engage the fish upon upward movement of the barrel relative to the slips.

8. A fishing tool embodying a vertically extending barrel adapted to be attached to a drill stem and to be lowered around the fish, a slip supporting block within the barrel and vertically and rotatively movable relative thereto, said block being adapted to rest upon the fish, a plurality of vertically extending slips within the barrel and circumferentially arranged about the axis thereof and about the fish, means for supporting said block in the barrel, said slips being joined at their upper ends to said block supporting means and radially movable relative to the barrel, means for releasably locking the block in its uppermost position relative to the barrel by turning the drill stem and the barrel relative to said block, the slips being in their outer radial positions when the block is in said uppermost relative position, and wedge means on said barrel adapted to cause the slips to move radially inward to engage the fish upon upward movement of the barrel relative to the slips.

9. In a fishing tool embodying a vertically extending barrel adapted to be suspended from a drill stem and to be lowered about the fish, a relatively vertically movable slip supporting member within said barrel, a plurality of slips within the barrel mounted loosely on said supporting member and adapted to surround the fish, said slips being vertically and radially movable relative to the barrel, a ring stationarily mounted in the barrel, a vertically movable slip engaging wedge ring spaced above said stop ring, and compressible packing material between said rings adapted to engage the fish when the rings are brought relatively together.

10. In a tool of the character described, a vertically extending barrel, a plurality of slips within the barrel and circumferentially arranged about the axis thereof, a stop ring stationarily mounted in the barrel, the upper portion of said ring being spaced from the barrel to form an annular channel, a vertically movable slip engaging wedge ring above said stop ring and engageable therewith, the lower portion of said wedge ring depending within said channel, and compressible packing material between said rings adapted to spread radially inward when the rings are brought relatively together.

In witness that I claim the foregoing I have hereunto subscribed my name this 10th day of December 1928.

ELMER E. PRYOR.